United States Patent
Wang et al.

(10) Patent No.: US 7,039,288 B2
(45) Date of Patent: May 2, 2006

(54) FABRICATION OF OPTICAL WAVEGUIDES FOR REDUCTION OF MINIMUM WAVEGUIDE SPACING

(75) Inventors: Everett X. Wang, San Jose, CA (US); Dmitri E. Nikonov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 09/814,425

(22) Filed: Mar. 21, 2001

(65) Prior Publication Data

US 2002/0136518 A1 Sep. 26, 2002

(51) Int. Cl.
*G02B 6/36* (2006.01)

(52) U.S. Cl. .................. 385/132; 385/131; 438/31; 216/24

(58) Field of Classification Search .............. 385/132, 385/129–131, 14; 216/24; 438/31
See application file for complete search history.

(56) References Cited

U.S. PATENT DOCUMENTS

| | | | |
|---|---|---|---|
| 5,193,137 A | 3/1993 | Hoshino et al. | |
| 5,263,111 A * | 11/1993 | Nurse et al. | 385/130 |
| 5,281,305 A | 1/1994 | Lee et al. | |
| 5,408,569 A * | 4/1995 | Nishimoto | 385/132 |
| 5,410,622 A * | 4/1995 | Okada et al. | 385/14 |
| 5,770,465 A * | 6/1998 | MacDonald et al. | 216/2 |
| 6,355,184 B1 * | 3/2002 | Crevasse et al. | 216/93 |
| 6,434,282 B1 * | 8/2002 | Binkley et al. | 385/8 |
| 6,506,289 B1 * | 1/2003 | Demaray et al. | 204/192.26 |
| 6,615,614 B1 * | 9/2003 | Makikawa et al. | 65/386 |
| 6,768,856 B1 * | 7/2004 | Akwani et al. | 385/129 |

FOREIGN PATENT DOCUMENTS

| | | | |
|---|---|---|---|
| EP | 02251912 | 10/1990 | |
| EP | 09080246 | 3/1997 | |
| JP | 09080246 | * | 3/1997 |
| WO | US 02/22274 | 6/2003 | |

* cited by examiner

*Primary Examiner*—Frank G. Font
*Assistant Examiner*—Michael P. Mooney
(74) *Attorney, Agent, or Firm*—Blakely, Sokoloff, Taylor & Zafman LLP

(57) ABSTRACT

A fabrication method reduces minimum waveguide spacing in an integrated optical device. Core regions of the waveguides are etched into cladding material and then filled with core material, instead of etching the spacing between the core material first and then filling the spacing. This allows the spacing between the core regions to be made arbitrarily small, without being constrained by an aspect ratio associated with a conventional etch and deposition/reflow process used to form waveguide spacings.

5 Claims, 2 Drawing Sheets

FABRICATION OF OPTICAL WAVEGUIDES FOR REDUCTION OF MINIMUM WAVEGUIDE SPACING

TECHNICAL FIELD

This disclosure relates generally to device fabrication, and in particular but not exclusively, relates to fabrication of optical waveguides on planar lightwave circuits, where minimum waveguide spacing is reduced.

BACKGROUND

Integrated optical devices, such as those formed on a planar lightwave circuit chip, typically include optical components in the form of optical waveguides. In fact, optical waveguides are often the fundamental component of all integrated optical devices. The optical waveguides operate to direct light signals from one location to another, and often branch out or "split" at various locations to allow the light signals to propagate to several different locations.

The spacing between optical waveguides, such as at a splitter location, are ideally made as small as possible. If the spacing is too wide, a larger profile is presented to light signals incident at the splitter location. This wide spacing causes the power incident on the spacing to become non-guided or scattered, and therefore lost in the device. This lost power adversely affects the efficiency and performance of the integrated optical device and the overall performance of the optical network.

Reducing spacing between waveguides is also helpful if chip size is an important consideration. By reducing the spacing between the waveguides, more "real estate" becomes available on the chip for placement of other components, and cost is also reduced.

Reducing space between waveguides, however, is easier said than done due to practical considerations and limitations associated with planar lightwave circuit manufacturing processes. For instance, currently used techniques do not allow for a spacing that is smaller than one given by an aspect ratio (depth divided by width) associated with a particular etch and deposition/re-flow process to form the spacing. The minimum waveguide spacing is determined by the maximum of this aspect ratio—the waveguide spacing cannot be reduced further if the waveguide spacing-to-waveguide height ratio exceeds the maximum aspect ratio allowed by the etch process. Moreover, even if this minimum spacing is reduced via use of an improved etching process, too small a spacing will often leave a void during a subsequent deposition/re-flow process to fill the spacing. This is because the deep and narrow spacing will be difficult to fill completely. The void can cause scattering of light and produces a defect in the circuit.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
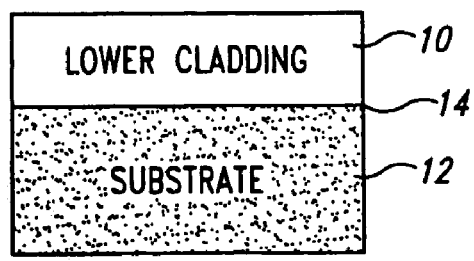
FIGS. 1–4 illustrate a process for fabricating optical waveguides on a planar lightwave circuit.

Embodiments of a method for fabricating optical waveguides on a semiconductor device are described herein. In the following description, some specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For simplicity and clarity of explanation, various embodiments of the invention are shown in the figures as cross-sectional views. It is to be appreciated that such views are merely illustrative and are not necessarily drawn to scale or to the exact shape. Furthermore, it is to be appreciated that the actual devices utilizing principles of the invention may vary in shape, size, configuration, contour, and the like, other than what is shown in the figures, due to different manufacturing processes, equipment, design tolerances, or other practical considerations that result in variations from one semiconductor device to another.

As an overview, an embodiment of the invention comprises a fabrication method that can reduce minimum waveguide spacing. An embodiment etches the waveguide from cladding material and then fills them with higher refraction index core material, instead of etching the spacing around the waveguide core and then filling the spacing with cladding material. That is, lower cladding material is first deposited and then etched to obtain the waveguide core regions. This etching is done such that the spacing between the waveguide core regions can be made arbitrarily smaller-smaller than the minimum waveguide spacing obtained with current techniques. Core material is then deposited in the etched waveguide core regions. Chemical-mechanical polishing can be performed next to remove excess core material. Upper cladding material is then deposited.

FIGS. 1–4 are cross-sectional views illustrating process flows associated with a fabrication technique for an optical waveguide, which an embodiment of the invention can improve upon to reduce waveguide spacing. Beginning with FIG. 1, a lower cladding material 10 is formed on a substrate 12, which together comprise a portion of an integrated optical device 14 or other integrated circuit. The substrate 12 can be made of a silicon or glass material, for example. The lower cladding material 10 can be made of silicon dioxide, for example, that is formed on the substrate 12 using thin-film deposition techniques, as examples, or via use of other methods.

Figure 2:
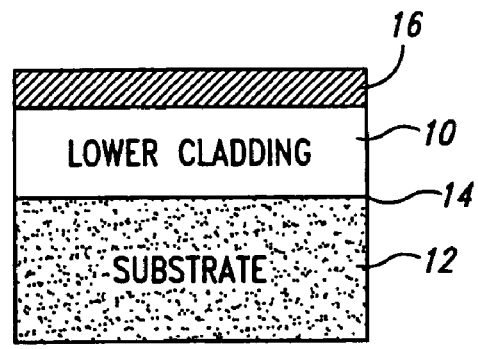

Next in FIG. 2, a core material 16 is deposited over the lower cladding material 10. The core material 16 can be made of germanium-doped silicon dioxide, silicon nitride, silicon, indium-phosphate material, as illustrative examples.

As shown subsequently in FIG. 3, a lithographic patterning, followed by a reactive ion etch, removes the core material 16 everywhere except at the waveguide locations. As a result, a spacing 18 is etched between the core material 16 left at the waveguide locations.

Figure 3:
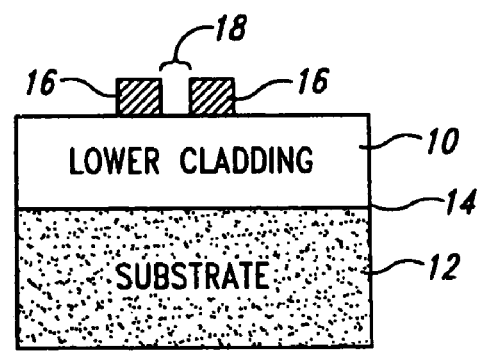

It is noted at this point that in the lithographic and etching processes used to obtain the structure of FIG. 3, limitations of lithography and etching preclude the spacing 18 from being smaller in width than what can be achieved according to the particular lithographic and/or etching technique used. Furthermore, the spacing 18 cannot be smaller/narrower than a width that ensures complete filling of the spacing 18 (without voids) for an upper cladding deposition/re-flow process that follows next. Specifically in FIG. 4, an upper cladding material 20 is deposited and re-flowed to cover the core material 16 and to fill in the spacing 18. A completed waveguide 22 results thereafter.

As evident in FIGS. 1–4, the width of the spacing 18 is constrained by the lithographic and etching processes that are used to remove the core material 16 everywhere except at the core regions, and by the subsequent deposition or re-flow process to fill the upper cladding material 20 into the spacing 18. Simply stated, the spacing 18 of FIGS. 3–4 cannot be reduced in width further without exceeding practical limitations of the lithographic, etching, or deposition/re-flow processes that are used.

FIGS. 5–9 are cross-sectional views illustrating a technique to reduce waveguide spacing according to an embodiment of the invention. Beginning first with FIG. 5, a lower cladding material 24 is formed over a substrate 26, which together comprise part of an integrated optical device 28 or other integrated circuit. The lower cladding material 24 and the substrate 26 can be made of similar materials as those of the device 14 shown in FIGS. 1–4. Similar techniques can also be used to form the lower cladding material 24 over the substrate 26. However, in accordance with an embodiment of the invention, the lower cladding material 24 is deposited as a thicker layer in FIG. 5. This thicker layer takes into account that the lower cladding material 24 will comprise not only the lower cladding, but also the lateral cladding of the waveguide (e.g., the cladding material in the waveguide spacing, as will be described below).

Figure 6:
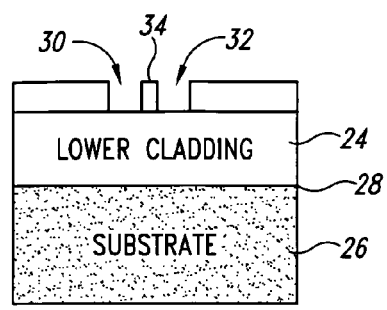

Next, in FIG. 6, a lithographic patterning is performed, followed by an anisotropic etch or other vertical etch to selectively remove portions of the lower cladding material from core regions 30 and 32. A reduced width spacing 34, adjacent to the core regions 30 and 32, results after the anisotropic etching. In accordance with an embodiment of the invention, the core regions 30 and 32 can be made as arbitrarily close to each other as possible during the lithographic patterning, in order to reduce the width of the spacing 34. Because the width of the core regions 30 and 32 is substantially greater than the width of the spacing 34 and because of the well-behaved aspect ratio of the core regions 30 and 32, the etching and subsequently filling processes are not limited by the width of the separation between the two adjacent waveguides. In an embodiment, the aspect ratio of the core regions 30 and 32 of the waveguide is independent of the spacing 34, and therefore, the etching and deposition processes need only address the aspect ratio of the core regions 30 and 32, which is normally much smaller than that of the minimum gap between two waveguides. In one embodiment, this minimum gap can be one micron or less in width for the spacing 34 (as compared to four microns for the spacing 18 of FIGS. 1–4).

Figure 7:
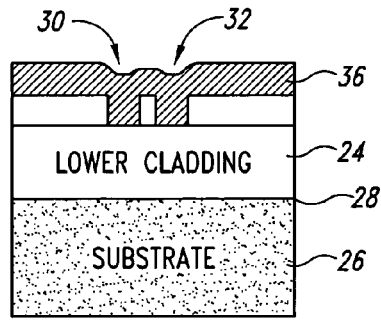
Figure 8:
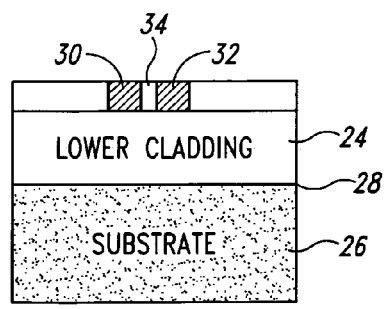
Figure 9:
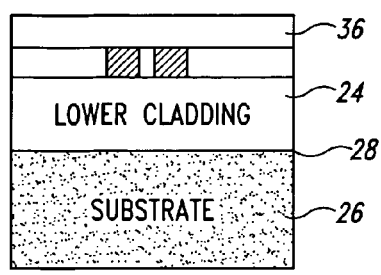

Next in FIG. 7, a core material 36 is deposited and/or re-flowed to cover the lower cladding 24 and the space 34, as well as to fill the core regions 30 and 32. The core material 36 can be made of a similar material as the core material 16 of FIGS. 2–4. Next in FIG. 8, a chemical-mechanical polish is used to remove the excess core material 36 except at the core regions 30 and 32, thereby making the upper surfaces of the core regions 30 and 32, the spacing 34, and the other regions of the cladding material 24 substantially flush. A final or upper cladding material 36 is deposited (using thin-film deposition techniques, for example) or re-flowed to finish the waveguide in FIG. 9.

Figure 4:
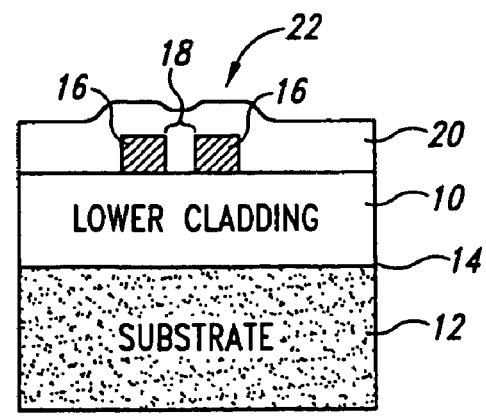
Figure 5:
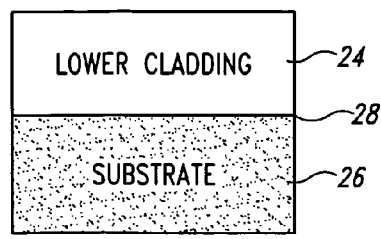
FIGS. 5–9 illustrate a process for fabricating optical waveguides on a planar lightwave circuit according to an embodiment of the invention.

As evident in FIGS. 5–9, there is no problem associated with a high aspect ratio associated with the minimum waveguide spacing. This is because the aspect ratio associated with the etch process to form the core regions 30 and 32 is the same as the aspect ratio of the waveguide (e.g., the aspect ratio of the core regions 30 and 32). The aspect ratio associated with a minimum width for the spacing 34 becomes substantially irrelevant. Moreover, there is less of a limitation associated with the aspect ratio for the deposition/re-flow process to fill the core regions 30 and 32 with core material 36, since the core regions 30 and 32 have suitable dimensions for uniform filling. Thus, the limitations on minimum waveguide spacing, as shown in FIGS. 3 and 4 for the etch and deposition/re-flow processes for the upper cladding material 20, are substantially removed by an embodiment of the invention.

It is also evident from the embodiments shown in FIGS. 5–9 that reduction of the minimum waveguide spacing allows placement of two or more waveguides at a much closer range. This reduced spacing improves performance of integrated optical devices, such as simple Y-branches to complex arrayed waveguide gratings. Also, throughput of the production of integrated devices is improved due to a simpler deposition/re-flow on a much better behaved surface—the core material 36 is easier to fill into the core regions 30 and 32 of FIGS. 6–7 than filling the upper cladding material 20 into the spacing 18 of FIGS. 3–4. In an embodiment, all the wells or trenches (e.g., the core regions 30 and 32) have the same aspect ratio that is easier for filling by the core material 36. This aspect ratio can be approximately 1 in an embodiment.

Furthermore, yield can be increased (and hence reduced costs) by the well-behaved surface topology for the deposition/re-flow of the core material 36 and/or for the upper cladding material 36. Better surfaces are also provided for subsequent processes. For example, a flat surface is provided by the upper cladding material 36 if an electric thin-film heater is needed for thermo-opto devices or electro-opto devices.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   forming a cladding material over a substrate;
   lithographically patterning and etching the cladding material to obtain core regions and a spacing between the core regions that is made of the cladding material;
   filling the core regions with a core material;
   using a chemicalmechanical process to remove excess core material formed over the core regions and over the cladding material; and
   forming another cladding material over the core regions and over the spacing.

2. The method of claim 1 wherein etching the cladding material comprises using an anisotropic etching technique.

3. The method of claim 1 wherein filling the core regions comprises using a deposition technique.

4. The method of claim 1 wherein filling the core regions comprises using a re-flow process.

5. The method of claim 1 wherein lithographically patterning the cladding material includes using a mask.

* * * * *